(12) United States Patent
Sacks et al.

(10) Patent No.: US 8,504,407 B2
(45) Date of Patent: Aug. 6, 2013

(54) ECONOMIC IMPACT ANALYSIS AND SUPPLIER INTERFACE SYSTEM

(76) Inventors: Justin Sacks, London (GB); Richard Wilde, Bromyard (GB); Adam Wilkinson, Whitley Bay (GB)

(*) Notice: Subject to any disclaimer, the term of this patent is extended or adjusted under 35 U.S.C. 154(b) by 558 days.

(21) Appl. No.: 12/369,749

(22) Filed: Feb. 12, 2009

(65) Prior Publication Data

US 2009/0240563 A1  Sep. 24, 2009

Related U.S. Application Data (60) Provisional application No. 61/028,015, filed on Feb. 12, 2008.

(51) Int. Cl.
*G06Q 10/00* (2012.01)

(52) U.S. Cl.
USPC .......................... 705/7.29; 705/7.31; 705/7.32

(58) Field of Classification Search
USPC ..... 705/7.12, 11, 27, 29, 30, 37, 38; 709/206; 706/52
See application file for complete search history.

(56) References Cited

U.S. PATENT DOCUMENTS

| | | | |
|---|---|---|---|
| 3,040,984 A * | 6/1962 | Cox et al. | 708/533 |
| 6,810,368 B1 * | 10/2004 | Pednault | 703/2 |
| 6,865,578 B2 * | 3/2005 | Hays | 1/1 |
| 7,288,921 B2 | 10/2007 | Huff et al. | |
| 7,474,080 B2 | 1/2009 | Huff et al. | |
| 2003/0061132 A1 * | 3/2003 | Yu et al. | 705/30 |

OTHER PUBLICATIONS

Davis, H. Craig, Regional Economic Impact Analysis and Project Evaluation, UBC Press 2001, p. 1 and 54.*
Beamon, Benita M., Supply chain design and analysis: Models and methods, International Journal of Production Economics, 1998, vol. 55, pp. 281-294.*
Justin Sacks, The Money Trail, The countryside agency, New Economics Foundation, 2002.*
Sara Aase; The Number Factory; Twin Cities Business Magazine; Feb. 2008; p. 5; http://www.tcbmag.com/features/features/95796p7.aspx.
Elizabeth Cox; Local Multiplier 3; New Economics Organization; Apr. 18, 2009; http://www.neweconomoics.org/gen/tools_lm3.aspx.

* cited by examiner

*Primary Examiner* — Ig T An
*Assistant Examiner* — Michael Maicher (57) ABSTRACT

A method, apparatus and program product may measure the economic impact of a business venture on a targeted area. An organization's expenditure data may be automatically analyzed in conjunction with supplier survey data indicative of how the initial project budget investment is re-spent. Correspondence prompting payees to upload the survey data may be automatically generated and sent. A multiplier or other economic indicator useful in analyzing economic impact may be automatically generated using the original investment figure, as well as the expenditure and survey data. Program code may enable modeling of different scenarios to optimize money allocation.

19 Claims, 10 Drawing Sheets

ROUND 1: GROSS PROJECT INCOME

PROJECT BUDGET: NON-PAYROLL

THE PROJECT BUDGET FIGURE YOU SHOULD BE THE GROSS INCOME FOR THAT PROJECT, WHETHER IT IS A SPECIFIC PROJECT, CONTRACT, OR COMPANY TURNOVER AND SHOULD INCLUDE THE PERSONNEL COSTS YOU WILL ITEMISE BELOW.

PROJECT BUDGET [ 1000000.00 ]   e.g. 100,000   DO NOT USE A £ SYMBOL

— 162

PERSONNEL AND PAYROLL BUDGET

THE LM3 ONLINE PROCESS USES PROXY INDICATORS FOR PERSONNEL EXPENDITURE. WE HAVE ADOPTED THIS METHOD BECAUSE MOST ORGANISATIONS FIND SURVEYING STAFF TO BE TRICKY. BASES ON HISTORIC DATA RESULTS FROM LM3, WE USE THE FOLLOWING PROXIES FOR PERSONNEL SPENDING:

- LOCAL STAFF SPEND 66% OF THEIR TOTAL INCOME
- NON-LOCAL STAFF SPEND 33% OF THEIR INCOME LOCALLY

TOTAL PAYROLL
ENTER TOTAL PAYROLL BILL EXCLUDING NI, TAX AND PENSION CONTRIBUTIONS. NOTE WE WILL NOT INCLUDE NI, TAX AND PENSION CONTRIBUTIONS ON THE BASIS THAT THESE ARE CONSISTENT FIGURES ACROSS ALL EMPLOYEES.

LOCAL AREA     164 —[ 60000.00 ]     e.g. 100,000.00

NON LOCAL AREA 166 —[ 120000.00 ]

[ SAVE ] — 168

FIG. 6

ROUND 3: SUPPLIER SURVEY: PREVIEW EMAIL

| SUPPLIERS |
|---|
| BELOW IS A TEMPLATE EMAIL THAT YOU CAN USE FOR CONTACTING YOUR SUPPLIERS. YOU CAN CHANGE ANY PART OF THE LETTER EXCEPT THE ITA MS BELOW.<br>THERE ARE 5 SUPPLIERS THAT WILL BE NOTIFIED. |

| WORDS THAT YOU MUST NOT CHANGE |
|---|
| THE FOLLOWING KEYWORDS REFER BACK TO YOUR DATA UPLOAD AND WILL BE REPLACED AUTOMATICALLY WHEN YOU SEND THE SUPPLIER NOTIFICATION:<br>　　$$CONTACTNAMES$$ - THE SUPPLIERS CONTACT NAME<br>　　$$ORGANISATION$$ - YOUR ORGANISATIONS NAME (JOHN DOE CHARITABLE TRUST)<br>　　$$PASSWORD$$ - THE PASSWORD THE SUPPLIER WILL USE TO LOGIN WITH<br>　　$$CONTACT$$ - YOUR NAME (JOHN DOE)<br>　　$$CONTACTEMAIL$$ - YOUR EMAIL (john.doe@k2a.com)<br>　　$$URL$$ - THE URL GIVEN TO THE SUPPLIER SO THEY CAN LOGIN TO THE SYSTEM |

SUBJECT [                    ]

[PARAGRAPH ▲] [FONT ▲] [SIZE ▲] [COLOR ▲] | B / U abc X X ⌀

DEAR $$CONTACTNAMES$$

$$ORGANISATION$$ IS CURRENTLY UNDERTAKING RESEARCH TO ASSESS HOW ITS SPENDING ON GOODS AND SERVICES IMPACTS ON ITS LOCAL ECONOMY. AS A FIRST STEP WE ARE USING A TOOL CALLED LM3 TO MEASURE HOW MUCH OF THE ORGANISATIONS EXPENDITURE GOES INTO THE LOCAL ECONOMY AND THEN HOW MUCH OF THAT EXPENDITURE IS RE-SPENT IN OUR LOCAL AREA. THIS WILL ENABLE US NOT ONLY TO QUANTIFY HOW MUCH WE CONTRIBUTE TO THE LOCAL ECONOMY THROUGH OUR BUSINESS OPERATIONS BUT ALSO TO IDENITFY HOW WE CAN IMPROVE OUR IMPACT IN THE FUTURE. YOUR HELP IS REALLY CRITICAL TO US BEING ABLE TO SHOW THIS AS ACCURATELY AS POSSIBLE.

OUR RECORDS SHOW THAT YOU RECEIVED PAYMENT(S) FROM OURSELVES IN THE LAST FINANCIAL YEAR AND AS ONE OF OUR SUPPLIERS I HOPE THAT YOU WILL BE ABLE TO HELP AND I WOULD BE GRATEFUL IF YOU COULD FOLLOW THE LINK

[DESIGN] [HTML]

PREVIEW EMAIL

SEND PREVIEW TO [john.doe@k2a.com]   [PREVIEW] [RESET]
ONCE YOU HAVE SENT AND CHECKED THE PREVIEW EMAIL, YOU WILL BE ABLE TO SEND THIS EMAIL OUT TO ALL OF YOUR SUPPLIERS.

FIG. 7

LM3 RESULTS: SUPPLIER ANALYSIS: BREAKDOWN

| 192 | 192 | 194 | 196 | 198 | 200 | 202 |
|---|---|---|---|---|---|---|
| | | | ALL RESPONSES | | | |
| SUPPLIER NAME | CONTACT NAME | EMAIL | CONTACT VALUE | LOCAL | NON-LOCAL | IN AREA |
| CARPENTER'S COOPERATIVE | JOHN DOE | EMAIL | £50,000.00 | £30,000.00 (60.00%) | £20,000.00 (40.00%) | NO |
| HT RECRUITERS Ltd | JIM DOE | EMAIL | £120,000.00 | £80,400.00 (67.00%) | £39,600.00 (33.00%) | NO |
| JOE DOE PLUMBING Ltd | JOE DOE | EMAIL | £25,000.00 | £67,500.00 (27.00%) | £182,500.00 (73.00%) | YES |

LM3 RESULTS: HOMEPAGE: WHAT IF SCENARIOS

WHAT IF?

ENTER TARGET SHIFT (IN %) TO SEE IMPACT ON LOCAL ECONOMY IF ACHIEVED    10 ▶ GO

LM3 RESULTS
SUMMARY

| ROUND | | ROUND TOTALS |
|---|---|---|
| 1 | GROSS PROJECT INCOME | 1,180,000.00 |
| 2 | PROJECT EXPENDITURE | 510,000.00 |
| 3 | MONEY RE-SPENT LOCALLY | 518,450.00 |
|   | TOTAL | 2,208,450.00 |
|   | LM3 | 1.87 |

THE IMPACT OF INCREASING YOUR LOCAL SPEND BY 10% IS:
THE TOTAL INCOME NOW GENERATED FROM YOUR PROJECT IS £2,208,450
AND THIS INCREASES YOUR ANNUAL CONTRIBUTION TO THE LOCAL ECONOMY TO £518,450.00
EVERY £1.00 OF YOUR PROJECT'S GROSS INCOME NOW GENERATES AN ADDITIONAL £0.87 FOR THE
LOCAL ECONOMY

FIG. 10

ECONOMIC IMPACT ANALYSIS AND SUPPLIER INTERFACE SYSTEM

RELATED APPLICATIONS

This application claims priority to U.S. Provisional Ser. No. 61/028,015, which was filed on Feb. 12, 2008, and the disclosure of which is incorporated by reference herein.

FIELD OF THE INVENTION

The present invention relates generally to computer implemented data processing, and more particularly, to networked computer analysis systems.

BACKGROUND OF THE INVENTION

Commercial and government organizations must understand the economic consequences of their monetary expenditures to be efficient and productive. The monetary influx stemming from an organization's payroll, suppliers, purchases and other downstream budgetary allocations can have a dramatic and surprising impact on a region's economy. Local economic vitality affects most any organization, and those organizations have an interest in seeing to it. A true understanding of an organization's role in the local economy can help private, public and nonprofit organizations optimize supply chains, secure more government incentives and increase the effect of purchasing on local economic development.

Correctly gauging that potential impact helps decision makers better understand the organization's importance to the area and can help improve the economic vitality of the region. For example, a nonprofit organization may spend one million dollars to build a headquarters. The monetary allocation does not disappear, but rather becomes wages to builders and revenue to suppliers, among other expenditures. The builders, in turn, will have income to spend, and may combine to spend one and a half million, themselves. As such, understanding economic consequences can be used to predict changes needed to stimulate a regional industry or economy. Such economic considerations should drive decisions to invest in a particular commercial venture. Organizations should consequently know how to strategically use their budgets. Such knowledge must include an understanding of how the downstream exchange of information impacts local and nonlocal economies.

To this end, numerous manuals and studies have been published on the topic. However, such publications can be difficult to apply to real business ventures, as the complexities of budget and expenditure analysis take years of experience to appreciate. Such analysis also requires extraordinary organizational and mathematical skills. Most organizations do not have such expertise in-house, and consequently must hire consultants to analyze the effects of their spending. Such consultation services can be expensive for many organizations, however. Moreover, the results of some consults may seem relatively subjective and remain difficult to understand for organizations.

Some conventional economic analysis is based on input-output methodologies. Input-output analysis generally shows how the output of one industry is an input for another industry. Such analysis requires massive datasets that quickly become dated. Conventionally gathering the requisite data is too time consuming and expensive to be feasible. Economists are consequently relegated to using models with aggregated production employment, and trade data from local, regional, and national sources, such as the Census Bureau.

The labor and cost intensive nature of such studies further causes them to be accomplished sporadically, only when there is an exceptional need. For instance, a study may be undertaken only when an organization is considering a large capital project or a grant evaluation. Studies timed as such are not used in the more frequent day-to-day operations or strategic planning of the organizations.

Studies and other methods of gauging economic impact often cannot be focused on any specific geographical area, leading to unreliable and unfocused data pools. That is, analysis generally represents an average across an entire industry and is not specific to the unique circumstances of a particular organization. The unreliable, expensive and/or confusing nature of studies may cause business decision makers to altogether ignore the potential or actual effects of their business on a local community.

There consequently exists a need for an improved manner of determining an economic impact of a business venture on a target community.

SUMMARY OF THE INVENTION

Embodiments of the present invention provide an improved computer-implemented method, apparatus, and program product for measuring an economic impact of a business venture on a target community. The computer-implemented method comprises receiving expenditure data associated with a plurality of payees each associated with receiving a respective monetary allocation and automatically prompting a payee of the plurality using the expenditure data to provide survey payment data indicative of how the payee used the monetary allocation. The method further automatically accesses the survey payment data and expenditure data to generate an indicator useful in assessing the economic impact of the business venture.

Processes consistent with the invention may receive the survey payment data from the plurality of payees. Where so configured, the survey payment data may comprise electronic mail. Aspects of the invention may automatically generate correspondence addressed to the payee. An account for each payee may be automatically established.

Embodiments may receive project income data. Embodiments may further receive geographic data selectively defining the area of the analysis. Access to either or both the survey payment data and the indicator may be licensed.

The indicator may be generated by automatically summing the expenditure and survey payment data with project income data, and then dividing the resultant sum by the project income data. Embodiments may apply a formula to the expenditure data comprising personnel data, wherein the formula is associated with a re-spending rate. A value may be assigned to nonresponsive payees. Embodiments consistent with the invention may automatically determine an error in the expenditure data.

Aspects of the invention may enable the user to model analysis using a different variable. Embodiments may facilitate and encourage communications between an organization and the payee of the organization. Survey payment data may be accessed according to either or both of the location and type of payee.

An apparatus consistent with the invention includes a memory storing program code that is configured to receive expenditure data associated with a plurality of payees each associated with receiving a respective monetary allocation, to automatically initiate prompting a payee of the plurality using the expenditure data to provide survey payment data indicative of how the payee used the monetary allocation, and to automatically access the survey payment data and expenditure data to generate an indicator useful in assessing the economic impact of the business venture. A processor in communication with the memory may be configured to execute the program code.

According to an aspect of the invention, the apparatus may comprise a server. The program code may be further configured to prompt the payee by generating correspondence addressed to the payee. An embodiment of the program code may receive geographic data defining a boundary of the economic assessment.

Another aspect of the invention may include a program product comprising program code configured to receive expenditure data associated with a plurality of payees each associated with receiving a respective monetary allocation, configured to automatically initiate prompting a payee of the plurality using the expenditure data to provide survey payment data indicative of how the payee used the monetary allocation, and to automatically access the survey payment data and expenditure data to generate an indicator useful in assessing the economic impact of the business venture. The embodiment may include a computer readable medium bearing the program code. Program code may further be configured to receive additional information and accumulate responses concurrently.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

BRIEF DESCRIPTION OF THE DRAWINGS

FIG. 7 shows an example of supplier correspondence automatically generated by the system of FIG. 1 for prompting the supplier to provide survey payment data in accordance with the underlying principles of the present invention.

DETAILED DESCRIPTION

Embodiments consistent with the underlying principles of the present invention may include a web-based platform and associated computer-implemented program for measuring economic impact. Aspects of the invention include an automated economic model for capturing local multiplier data and determining the economic contribution to a target community made by an organization. Other or the same embodiments present a computer-implemented manner of developing the vitality of the supply chain.

An organization's expenditure data may be automatically analyzed in conjunction with supplier survey data indicative of how the initial project budget investment is re-spent. Correspondence prompting payees to upload the survey data may be automatically generated and sent. A payee for purposes of this disclosure may generally include an organization's personnel, a supplier, a supplier's personnel, a supplier's vendor or any entity downstream of and affected by the original expenditure of the organization. A multiplier or other economic indicator useful in analyzing economic impact may be automatically generated using the original investment figure, as well as the expenditure and survey data. Program code may enable modeling of different scenarios to optimize local income generation.

Aspects of the invention may draw from current data, rather than older statistics. Results may be generated for specific organizations instead of an average for an entire industry. Embodiments encourage public, private and nonprofit organizations to consider their spending behaviors as a key lever for their company.

Aspects of the invention may allow organizations to continuously measure their economic impact. Results may dynamically track actual business transactions. This continuous monitoring and relatively easy access to information helps make economic analysis part of day-to-day operations and strategic planning, as opposed to being used sporadically or not at all. Processes highlight where spending may be localized. This feature may focus decision makers on economic changes.

Embodiments may increase profits for the private sector by localizing supply chains, securing more government incentives and promoting positive press. The public sector may use aspects of the invention to increase the effect of procurement and other purchasing on local economic development. Embodiments may be used to plan economic development strategies by targeting appropriate industries. Such organizations may further prioritize the use of enterprise incentives. The nonprofit sector may use embodiment consistent with the invention to maximize the impact of spending to meet their mission and targets. Ready availability of the information generated by embodiments may allow non-profit and charitable organizations to more readily prove their commitment and influence in local areas thereby increasing their likelihood of obtaining donations, grants, and third party funding.

Embodiments continuously and thoroughly provide actual surveying data pertaining to which goods and services are purchased by a local business. As such, embodiments may measure and promote local economic growth and/or regeneration. Embodiments may facilitate an understanding of how different parts of an economy are working. Aspects may provide an understanding of how money enters, the path it takes and how it leaves. Such an understanding may help determine whether a particular aspect of the economy is working well, and what action may be appropriate in view of this information.

Embodiments may additionally facilitate organizations engaging suppliers. A lack of dialog between the parties is a traditional hindrance. This facilitation may lead to developing the relationship, as well as an increase in strategic planning information.

One indicator consistent with embodiments of the invention may be generally determined by analyzing how much an organization spends, how that money is spent, and how that money is multiplied in the economy when re-spent. Aspects of the invention may use three rounds of expenditure analysis. There may be three rounds of spending within the targeted geographic area that are analyzed: the initial round of spending and two more rounds representing those portions of the initial round that are spent and re-spent within the targeted geographic area. While three rounds are adequate for most applications, other embodiments consistent with the invention may use the automated processes to accomplish more or fewer rounds as desired.

Aspects of the invention act not only as single standalone analysis, but as an incentive to improve performance. Embodiments increase local linkages to maximize the use of all incoming inward investment. This feature may generally enrich a community. Aspects of the invention may link to a specific industry and organization within that industry, allowing greater focus and flexibility. Exemplary economic sectors benefiting from embodiments of the invention may include government procurement, food and agriculture, social enterprise, access to finance and welfare.

Figure 1:
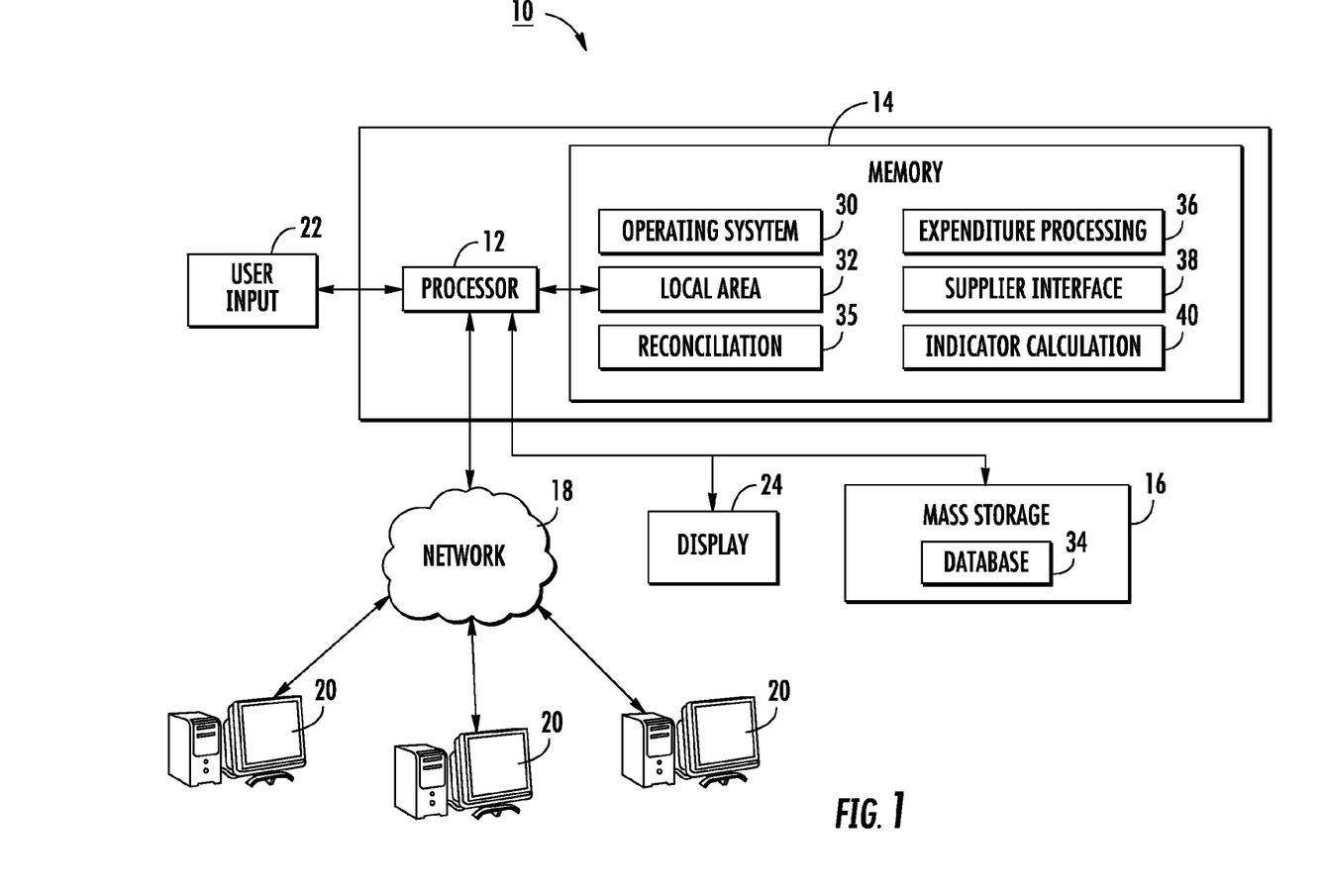
FIG. 1 shows an exemplary hardware and software environment for an apparatus suitable for measuring an economic impact on a local community in a manner that is consistent with the invention.

Turning now to the Drawings, wherein like numbers denote like parts throughout the several views, FIG. 1 illustrates an exemplary hardware and software environment for an apparatus 10 suitable for measuring an economic impact on a local community in a manner consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", or "system" although it should be appreciated the term "apparatus" may also include other suitable programmable electronic devices consistent with the invention.

System 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in system 10, e.g., any cache memory in a processor 12, as well as any storage capacity used as a virtual memory, e.g., as stored on a mass storage device 16 or on another computer coupled to system 10 via network 18 (e.g., a client computer 20).

System 10 also typically receives a number of inputs and outputs for communicating information externally. For interface with a user or operator, system 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with system 10 over network 18, or via a dedicated workstation interface or the like.

For additional storage, system 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, system 10 may include an interface with one or more networks 18 (e.g., a LAN, a WAN, a wireless network, and/or the Internet, among others) to permit the communication of information with other computers coupled to the network 18. It should be appreciated that system 10 typically includes suitable analog and/or digital interfaces between processor 12 and each of components 14, 16, 18, 22 and 24 as is well known in the art.

System 10 operates under the control of an operating system 30, and executes or otherwise relies upon various computer software applications, components, programs, objects, modules, data structures, etc. (e.g., database 34, among others). Moreover, various applications, components, programs, objects, modules, etc. may also execute on one or more processors in another computer coupled to system 10 via the network 18, e.g., in a distributed or client-server computing environment, whereby the processing required to implement the functions of a computer program may be allocated to multiple computers over a network.

As shown in FIG. 1, the memory 14 may include a local area determination program 32, an income-expenditure reconciliation program 35, an expenditure processing/formatting program 36, a supplier interface program 38 and indicator calculation program 40. The local area determination program 32 may enable a user to select geographic boundaries and thereby focus the analysis. The program 40 may present the same local area to payees accessing the network to upload survey payment data, and may automatically apply local area data to expenditure worksheets.

The income-expenditure reconciliation program 35 may match expenditure data to gross project income. Where appropriate, the expenditure processing program 36 may apply a formula to entered personnel data, as discussed herein. The expenditure processing/formatting program 36 may process the expenditure worksheet for errors and may prompt their correction. The program 36 may apply data to the survey and the calculation used to determine the indicator.

The supplier interface program 38 may create a unique identity for each payee, and may prepare electronic mail (email) or other correspondence. The indicator calculation program 40 may automatically draw data to determine an appropriate multiplier and/or ratio useful in economic analysis. The program 40 may further model scenarios for the use aimed at optimizing economic investment under varying conditions and levels of investment. Database 34 may store supplier, expenditure and other data used in the calculations and other aspects of analysis.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
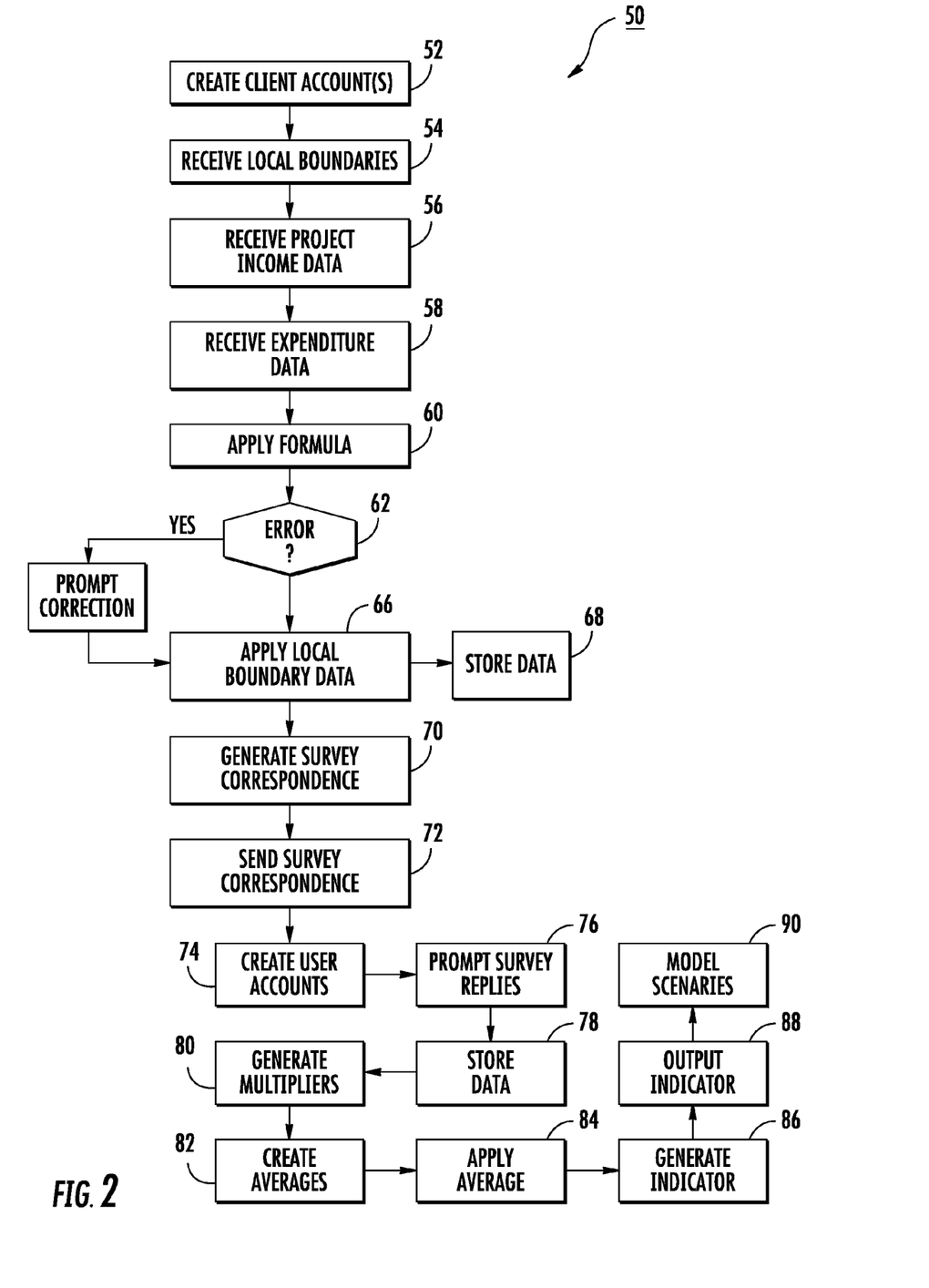
FIG. 2 is a flowchart having steps executable by the system of FIG. 1 for conducting an automated analysis of the impact of a business transaction on a local economy in accordance with the underlying principles of the present invention.

FIG. 2 is a flowchart 50 having steps executable by the system 10 of FIG. 1 for conducting an automated analysis of the impact of a business transaction on a local economy. The steps of the flowchart 50 of FIG. 2 may presume that an organization has licensed or otherwise engaged the host supporting the economic analysis system 10. Such a license may be for a limited or unlimited number of projects. An exemplary license may be fee based. The client may view existing projects or create new ones, as per the terms of their contract. The user may be provided a confidential pass code and other credentials to ensure secure access to the system 10.

At block 52 of FIG. 2, the system 10 may create one or more client accounts. For instance, an organization may login online to create one or more projects. An exemplary project may include building a dam or factory at given location.

Once the system 10 has assigned a number of projects to an authenticated user, the system 10 may receive at block 54 local geographic boundaries, or geographic data, from the organization. This geographic data may specify the local area that is to be the focus of the economic impact analysis. Such geographic data may be input in the form of zip codes or the name of a community. Geographic data may comprise political boundaries, coordinates, a neighborhood and/or a radius. The system 10 may automatically apply the geographic data to vary aspects of the analysis process, such as registering whether zip codes associated with survey respondents constitute local entities and expenditures.

At block 56 of FIG. 2, the system 10 may receive project income data. This project income data may correspond to the organization's budget for the project of interest, or an organization's revenue. This step at block 56 may also represent the first round of analysis. That is, round one is the project budget, e.g., how much the organization spends on payroll.

The system 10 may receive at block 58 expenditure data corresponding to how the project income data is spent in the target local area. This may include a breakdown of payroll and supplier payment information, and may designate whether the respective payee is local or non-local. The local spending by the organization may constitute the second round. This expenditure data may be entered using an uploaded spreadsheet formatted by the system 10. Alternatively, the expenditure data may be automatically retrieved from a database of the organization.

Exemplary expenditure data may include the vender/personnel name and email address, as well as gross payments to payees during the test period. Geographic data may also be uploaded as expenditure data. Other useful information pertinent to the payee may be stored (e.g., additional contact information, a minority owned business, number of employees, etc). This third round of expenditure data may include how the payee (e.g., the organization's employee) locally spent the project budget.

Where appropriate, the system 10 may at block 60 apply a personnel spending formula. That is, the system 10 will utilize a re-spending rate (e.g., a proxy rate), or may automatically apply a re-spending rate specified by the organization.

Should the system 10 determine at block 62 an error, such as a missing zip code associated with a vendor, the system 10 may prompt the user at block 64 to correct it. The system 10 may also verify that the total of all payments made to payees equals the total project revenue. If the error cannot be corrected, the user may have the option to proceed without the flawed data.

At block 66 of FIG. 2, the system 10 may apply the local boundary data entered at block 54. The system 10 may initiate the display of the survey area for the perusal of the user. The geographic data may be stored at block 68.

The system 10 at block 70 may initiate the generation of survey correspondence to payees identified in the expenditure data. Where desired, this correspondence may comprise email, fax, telephone and/or postal correspondence, among other forms of communication. Email correspondence may include PDF displays. The correspondence may be automatically generated using supplier name, address, associated project and other information. The correspondence may include secure login information for each payee, enabling single click Internet link web access to accommodate responses. The system 10 may enable the user to modify the correspondence before it is sent at block 72. Where desired, the system 10 may automatically send a preview of the email to the organization for its review.

User accounts corresponding to the payees (e.g., suppliers) may be created at block 74. These accounts may enable the suppliers to respond to the correspondence by logging onto the website to upload supplier expenditure data. This third round of expenditure data may comprise how the supplier(s)

locally re-spent their allocation of the project budget. The accounts may also provide an organizational framework for storing supplier data in the database 34.

The system 10 may prompt at block 76 downstream data comprising the survey replies. The survey replies may represent expenditure data for the payee comprising a breakdown of all of the supplier's vendors and how much was spent on them. The payee's (e.g., vendor's) zip code may also be uploaded or otherwise communicated. These replies may be stored at block 78. This third round of expenditure data may be real time and ongoing as more suppliers upload data. Where desired, an organization may send out subsequent, reminder correspondence to prompt unresponsive suppliers.

The system 10 at block 80 may generate multiplier figures for personnel as payee responses are received. The system 10 may apply an assumed re-spending rate for personnel according to entered expenditure information. Where appropriate and based on the response rate, the system 10 may create and apply averages to non-responsive payees at blocks 82 and 84, respectively.

At block 86, the system 10 may generate an indicator readily used to gauge economic impact. Related results may be displayed in both monetary and percentage terms. The indicator may be output at block 88 for the consideration of decision makers. The indicator may be continuously updated in embodiments where survey data continues to arrive.

The system 10 may automatically send correspondence in response to payee survey payment data thanking them for their participation and informing each payee of the economic impact of their spending on the venture/project. The organization may readily communicate with any payee using email to investigate any response. The system 10 may offer the organization the ability to model scenarios with different variables to help optimize economic impact.

Figure 3:
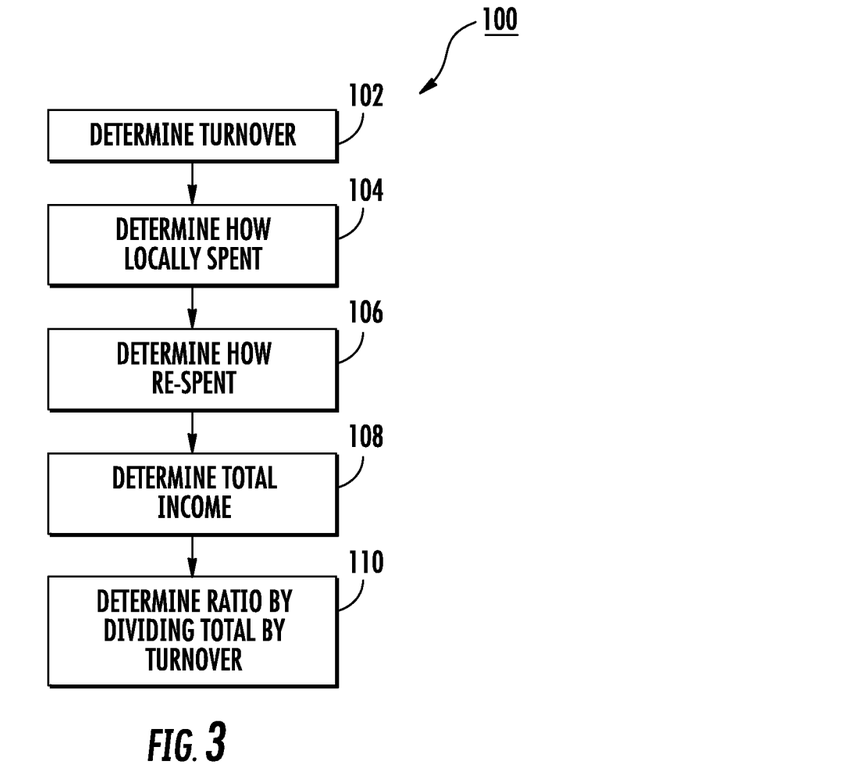
FIG. 3 shows in greater detail the automatic determination of the indicator used to measure the impact of a business transaction on a local economy in accordance with the underlying principles of the present invention.

FIG. 3 shows in greater detail the automatic determination of the indicator used to measure the impact of a business transaction on a local economy. As such, the processes of the flowchart 100 may expand upon block 86 of FIG. 2. Turning more particularly to the flowchart 100, the system 10 may determine at block 102 the project income data, or turnover. This step may involve accessing memory 14 to retrieve the project income input by the organization. This includes the source of income, or inflow, to be measured.

At block 104, the system 10 may determine how this original source of income is spent locally or in the other target community. This information may be drawn from expenditure worksheets discussed below in greater detail.

The system 10 may determine at block 106 of FIG. 3 how this money was re-spent by people, organizations and other payees. The system 10 may sum the figures at block 108 to determine the total generated income. At block 110, the system 10 may determine a ratio or other indicator of economic impact. The indicator may help decision makers understand the relationship between the original inflow and the total income generated. For example, the system 10 may divide the total determined at block 108 by the project income determined from block 102. The resultant indicator may reveal how different contracts that seem congruent on their face may have significantly different impact on the target community.

Figure 4:
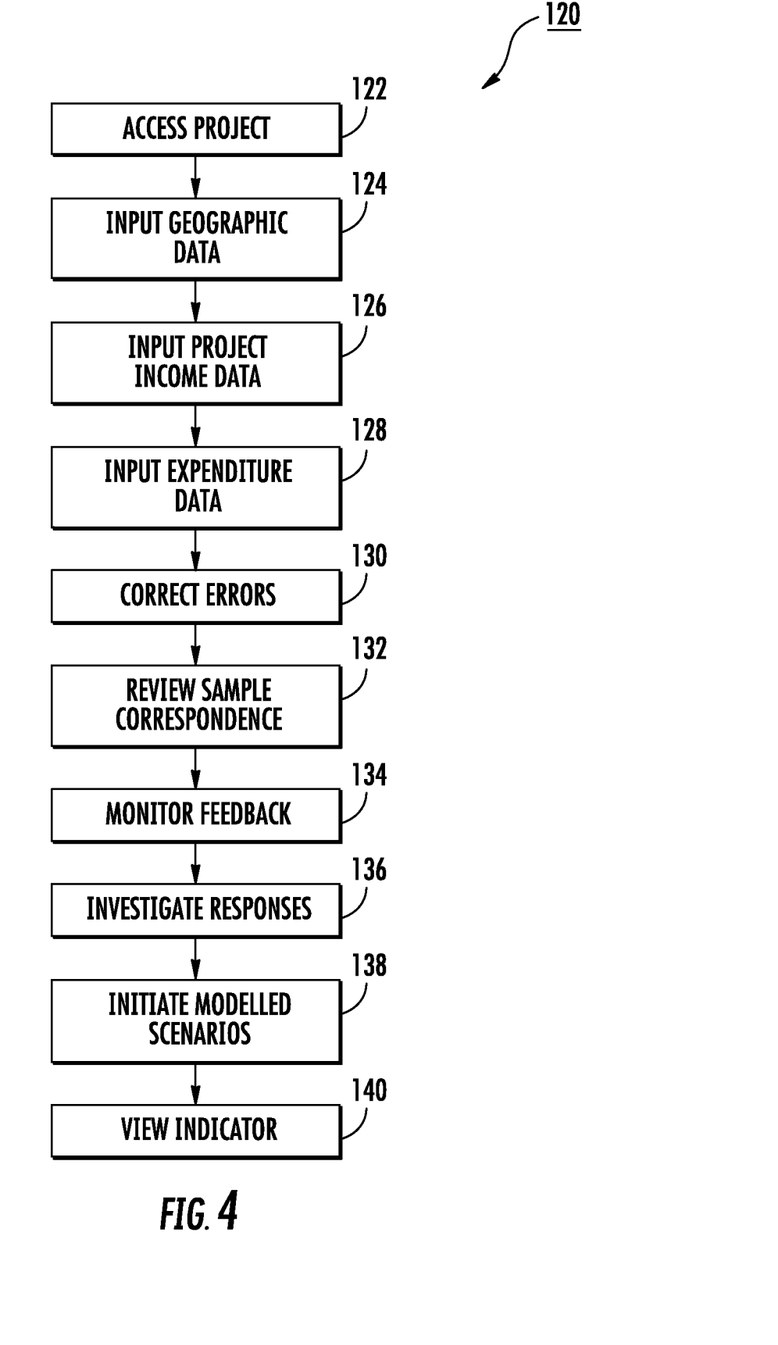
FIG. 4 is a flowchart having steps for assessing local economic impact using the system of FIG. 1 from the perspective of an organization in accordance with the underlying principles of the present invention.

FIG. 4 is a flowchart 120 having steps for assessing local economic impact using the system of FIG. 1 from the perspective of an organization. Turning more particularly to the flowchart 120, a user at block 122 may create or access an existing project. As discussed herein, an organization may have several different projects each including separate economic analysis.

After a user has been granted access to the system 10, the user may input geographic data at block 124. As discussed herein, the geographic data may specify the boundaries of the economic analysis. For instance, the client may use drop down menus to select zip codes or may specify a state, town or other community.

The project income data may be entered at block 126 by the organization. The project income data may represent the budget spent on the project. At block 128, the revenue may be broken down into personnel and/or supplier/venders. The organization may identify payroll expenditures designating which employees live within and outside the surveyed area. The user may elect to have the system 10 use an assumed re-spending rate for employees. The user may then upload such data, e.g., in a spreadsheet, as detailed project budget expenditures.

Exemplary expenditure data may include: payee names and email addresses, gross payments to payee during the analysis period, and geographic data pertaining to the payee. The user may also upload the physical address and phone number of a payee, as well as any additionally relevant information, e.g., minority owned business, number of employees, etc.). The expenditure data may be added into a form provided by system software, or the system 10 may automatically retrieve data from a proprietary database or form of the organization.

The user may be prompted at block 130 to correct any errors in the expenditure data. Such errors may pertain to an incomplete field and be automatically detected by the program code. The system 10 may additionally total all payments made to payees to ensure that they do not exceed and do equal the total project revenue. The user may elect to ignore errors and continue with the analysis.

At block 132, the user may be prompted to review sample correspondence, as well as a preview area on a map. The correspondence may be automatically generated at block 133 and addressed to payees (e.g., suppliers) identified in the expenditure data. The correspondence may be written to encourage the supplier to provide information as to how monies were re-spent. The correspondence is typically accomplished using email, but other forms of communication may be employed as per the organization's or supplier's preference, including printed postal mail. The user may receive a sample of a finished letter sent by the system 10 for their review. The user may also elect to send automatic reminder communications to any non-responsive payees.

As suppliers upload or otherwise report their survey payment data, the organization at block 134 may monitor the responses. The user may monitor feedback by location (local vs. non-local), payee type (organization's personnel, supplier, supplier's personnel, or supplier's vendor), and location and type together. The user may view the results in both monetary terms and by percentages at block 136. While the system 10 may automatically update calculations and other analysis tools, the user may elect to contact a supplier based on the feedback to discuss the results. By encouraging such communication between the organization and its suppliers, the supply chain may be made more vital and efficient for all parties.

Where desired, the decision makers of the organization may use the system 10 to model at block 138 different spending scenarios to gauge the differences in impact on the local economy. For example, the user may determine that increasing the initial investment by 10% results in a disproportionate boost to the local economy. The decision maker may monitor the actual and/or modeled indicators provided by the system 10 at block 140.

Figure 5:
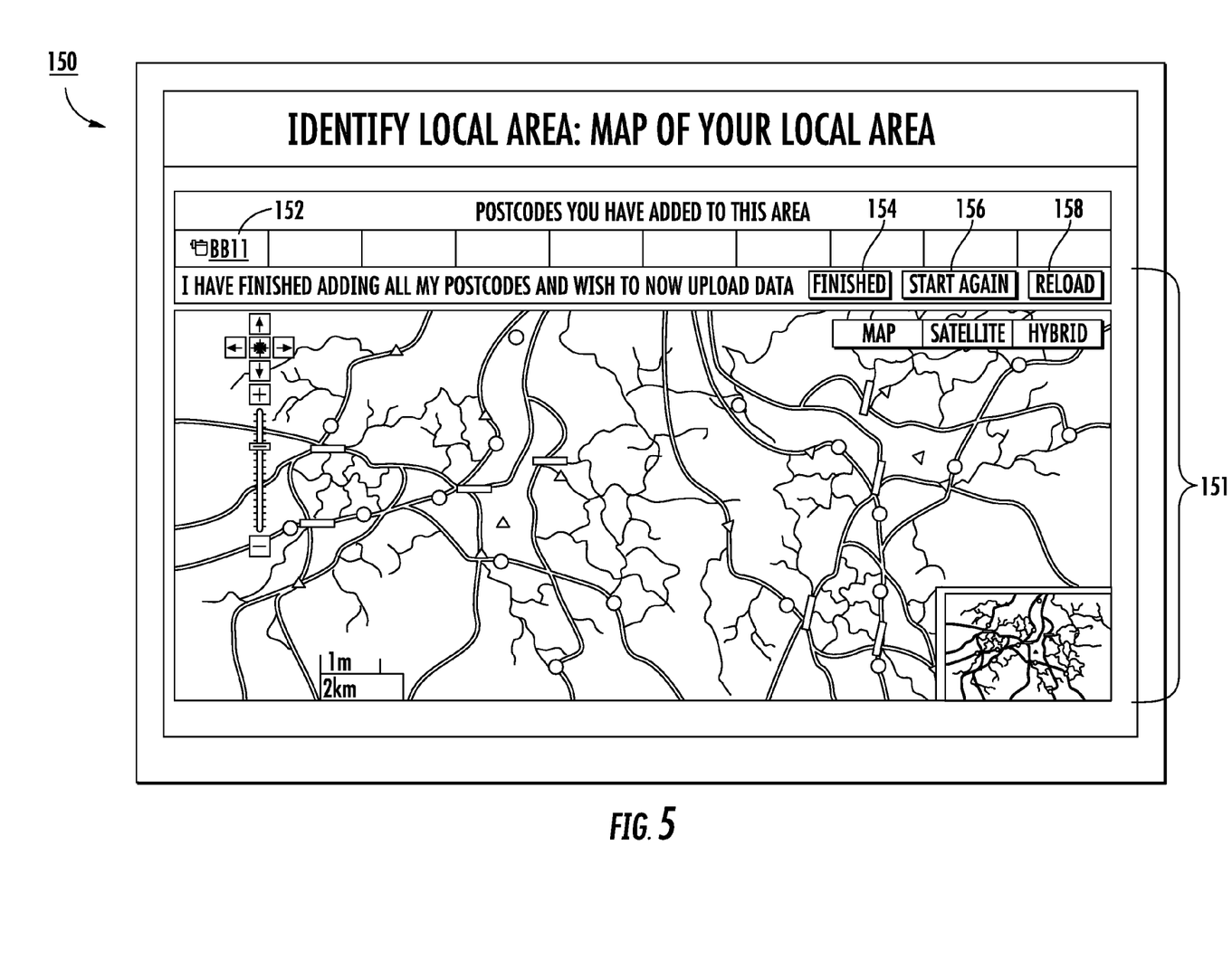
FIG. 5 shows an exemplary display screen generated by the system of FIG. 1 for prompting the user to identify a local area for the economic impact analysis in accordance with the underlying principles of the present invention.

FIG. 5 shows an exemplary display screen 150 generated by the system 10 of FIG. 1 for prompting the user to identify a local area for the economic impact analysis. As such, the display screen 150 may have application within the processes of block 54 of FIG. 2. The display 150 includes a map 151 depicting the geographic boundaries of the analysis. The display interface includes fields 152 where the user may enter postal/zip codes or other geographic data defining the region. Another exemplary display may allow for city, country or zip code search criteria. Other buttons 154, 156, 158 of the display 150 allow the user to respectively finish, begin again, or reload the geographic data in the display 150.

Figure 6:
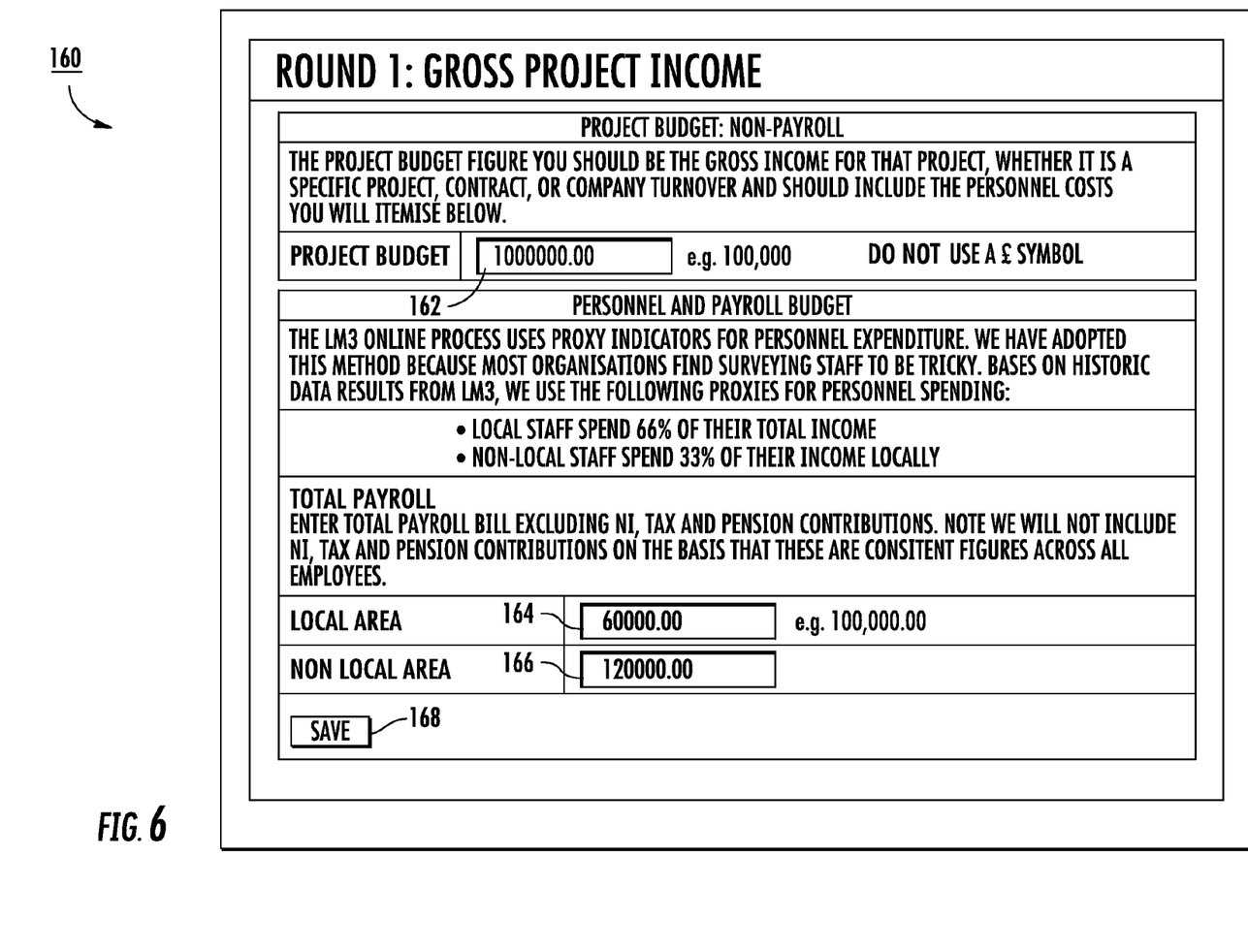
FIG. 6 shows an exemplary display screen generated by the system of FIG. 1 for prompting the gross project income associated with a business venture for use in determining its economic impact in accordance with the underlying principles of the present invention.

FIG. 6 shows an exemplary display screen 160 generated by the system 10 of FIG. 1 for prompting the gross project income associated with a business venture for use in determining its economic impact. As such, the display screen 160 may have application within the processes of block 56 of FIG. 2. The display 160 includes a field 162 into which the user may enter the gross income for the project. The project may include a contract or company turnover, and typically includes personnel costs. Such personnel payroll costs may be entered into fields 164, 166 of the display 160. The payroll information may be broken out between those employees that live locally and those that do not. For those personnel that live locally, the system 10 may apply a formula to determine what percentage of the payroll will be re-spent back into the local economy. For example, the system 10 may multiply the local area payroll by a percentage empirically determined to represent a percentage of that payroll likely to be spent. The system 10 may further determine what percentage of that number that will be spent locally. The user may save the data upon entering by selecting a display button 168.

FIG. 7 shows an example of supplier correspondence 172 automatically generated by the system 10 of FIG. 1 for prompting the supplier to provide survey payment data in accordance with the underlying principles of the present invention. As such, the exemplary email comprising the correspondence 170 may have application within block 70 of FIG. 2. Instructions 176 may be included for the sender within the display 170. The user may modify the correspondence 172 as appropriate, and may fill in the subject field 174. Certain keywords of the correspondence 172 may function as placeholders for uploaded data specific to each payee/supplier. The sender may include an email address 178 at which they may receive a preview or reset the correspondence using buttons 180 of the display 170.

Figure 8:
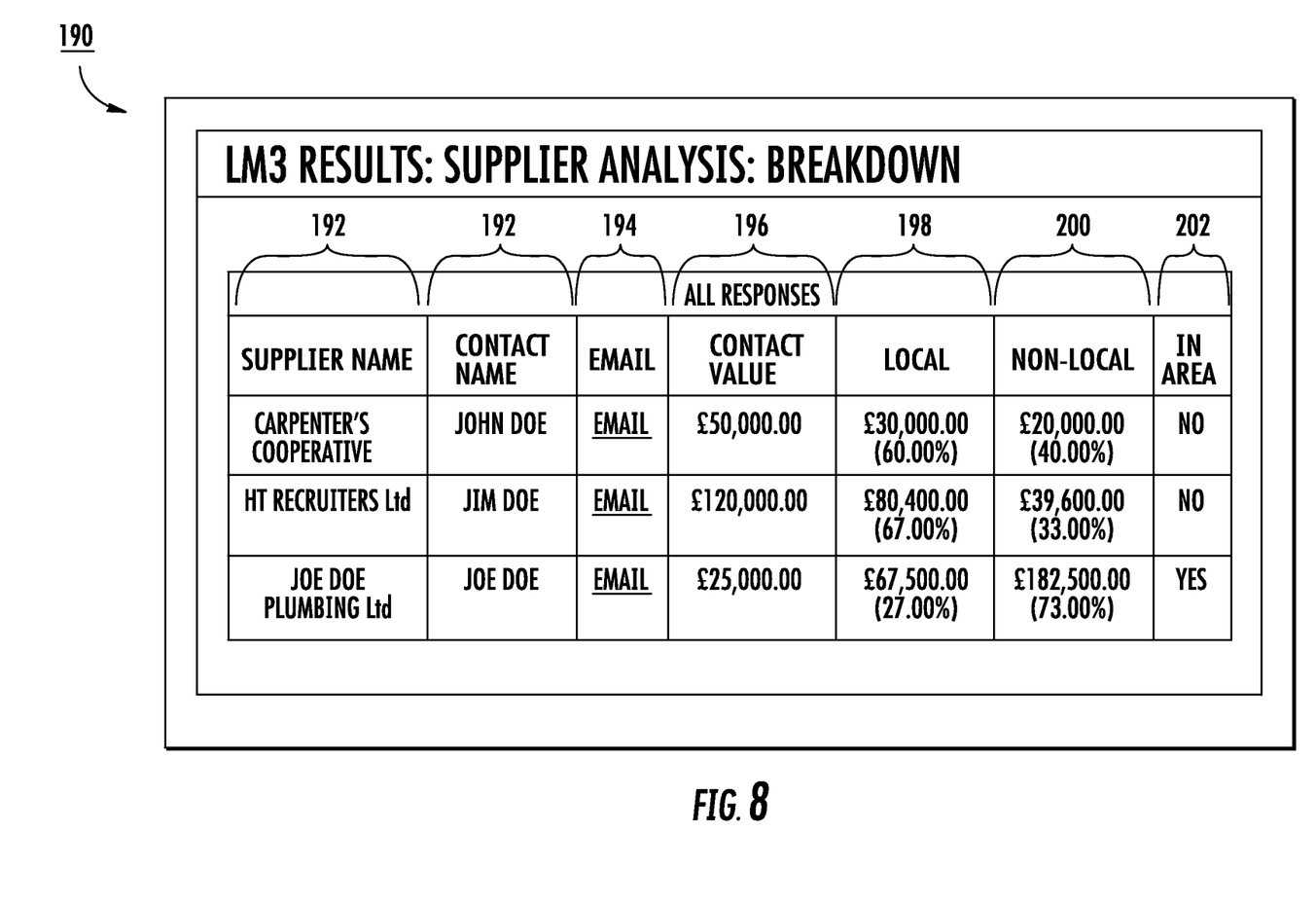
FIG. 8 shows an exemplary display screen generated by the system of FIG. 1 for showing a breakdown of supplier survey information for use in measuring economic impact in accordance with the underlying principles of the present invention.

FIG. 8 shows an exemplary display screen 190 generated by the system 10 of FIG. 1 for showing a breakdown of supplier survey information for use in measuring economic impact. As such, the display screen 160 may have application within the processes of block 134 of FIG. 4. The display 190 includes a column 192 identifying the name of the suppliers. Column 193 includes the contact name for the respective suppliers, and column 194 identifies their email account information. The value of the contract information is displayed in column 196. Columns 198 and 200 respectively identify the breakout of whether the money was spent locally or non-locally in dollars and percentages. Column 202 includes a designation as to whether the supplier is located in the area. The display 190 may allow users to drill down into any of the results for a breakdown of that summary by supplier. Decision makers may see how the suppliers responded and contact them about future activity.

Figure 9:
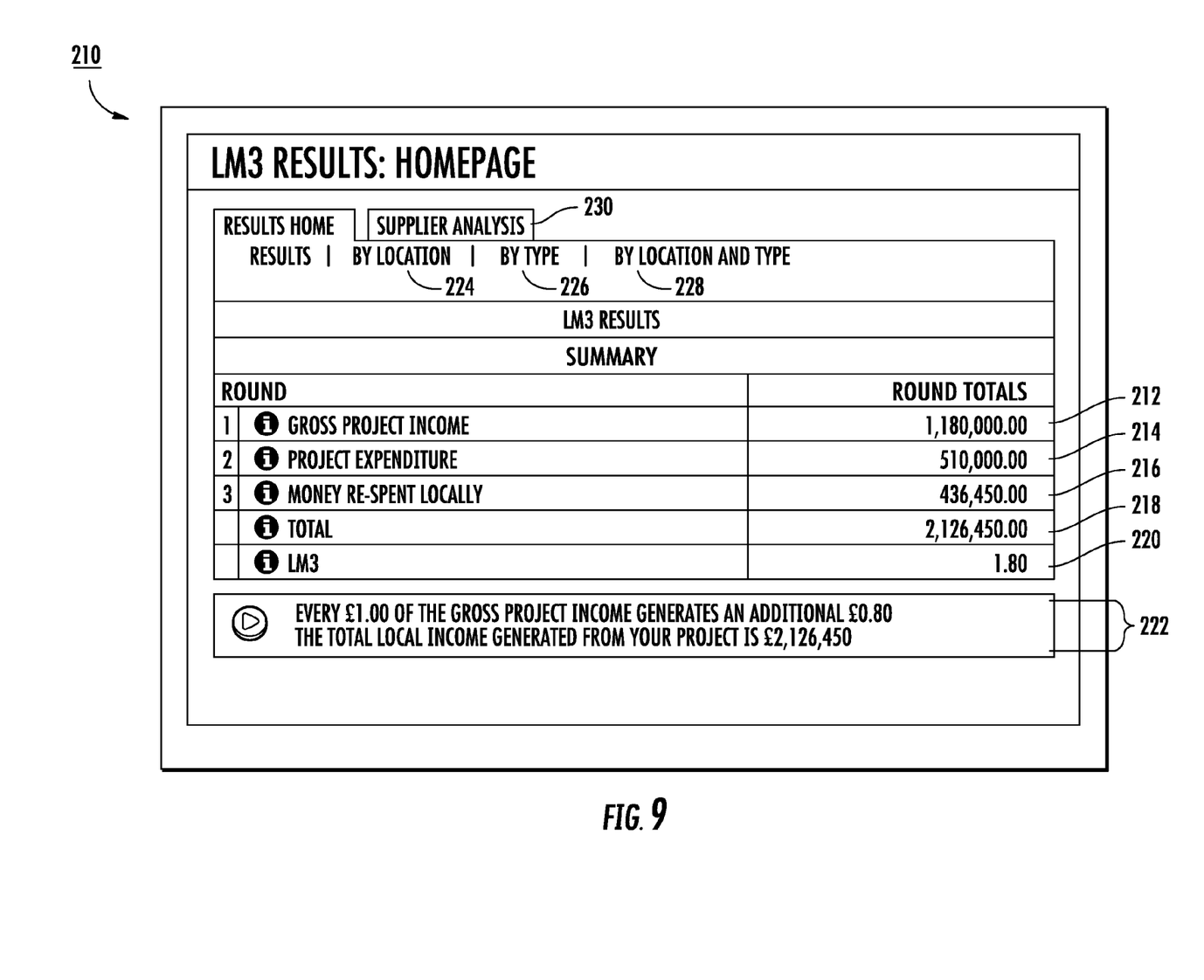
FIG. 9 shows an exemplary display screen generated by the system of FIG. 1 for presenting the results of the economic impact analysis in accordance with the underlying principles of the present invention.

FIG. 9 shows an exemplary display screen 210 generated by the system 10 of FIG. 1 for presenting the results of the economic impact analysis. As such, the display screen 210 may have application within the processes of block 88 of FIG. 2. The display 210 allows the user to monitor the analysis on a continuous basis. The display 210 generally shows the summary of the income generated by each round of expenditure and the indicator. Field 212 shows the gross project income, and field 214 shows the project expenditure. Field 216 displays the money re-spent locally. Field 218 shows the total, and field 220 shows the indicator. In this example, the indicator comprises local multiplier with three rounds of monetary expenditures. Text 222 explains the indicator score in words. The display allows the user to breakdown the results by type or location, or by location and type using tabs 224, 226 and 228, respectively.

Figure 10:
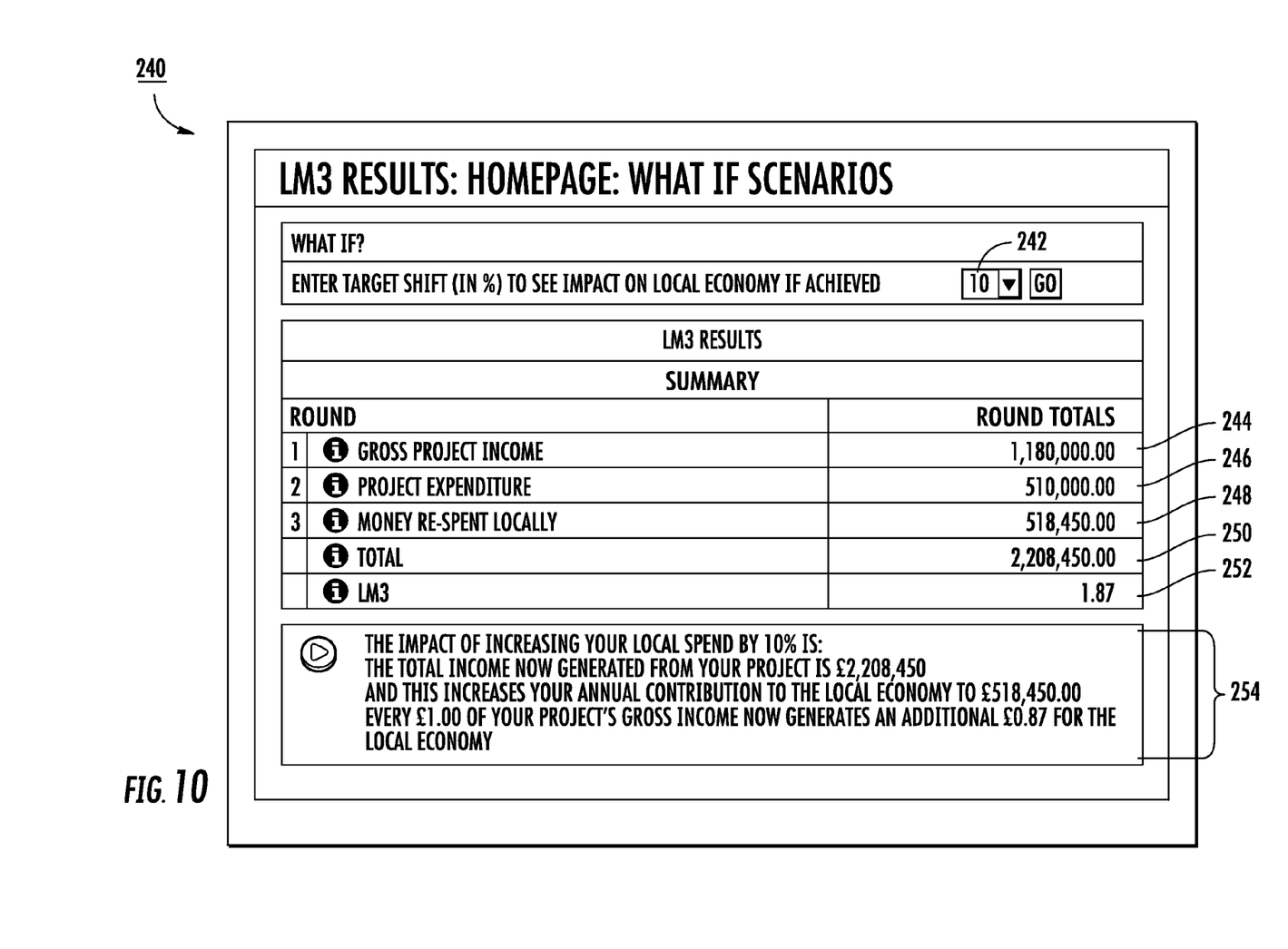
FIG. 10 shows an exemplary display screen generated by the system of FIG. 1 for enabling an organization to model possible scenarios and their associated economic impact in accordance with the underlying principles of the present invention.

FIG. 10 shows an exemplary display screen 240 generated by the system 10 of FIG. 1 for enabling an organization to model possible scenarios and their associated economic impact. As such, the display screen 240 may have application within the processes of block 90 of FIG. 2. The display 240 includes a field 242 that enables the user to see how shifting a percentage of spending from non-local to local suppliers may impact the local economy. Similar to the display 210 of FIG. 9, the display 240 includes field 244 that shows the gross project income. Field 246 shows the project expenditure. Field 248 displays the money re-spent locally. Field 250 shows the total, and field 252 shows the modeled indicator. Text in field 254 explains the figures and impact of the modeled change in words.

While the present invention has been illustrated by a description of various embodiments and while these embodiments have been described in considerable detail, it is not the intention of the Applicants to restrict, or, in any way limit the scope of the appended claims to such detail. For instance, while embodiments discussed herein apply largely to business related analysis, the underlying principles of automated analysis may apply equally to social enterprise and environment related ventures.

The invention in its broader aspects is therefore not limited to the specific details, representative apparatus and method, and illustrative example shown and described. Accordingly, departures may be made from such details without departing from the spirit or scope of Applicants' general inventive concept.

What is claimed is:
1. A computer-implemented method for measuring an economic impact of a business venture, the method comprising:
    providing an interface program executed on a non-transient computer readable medium by a processor to enable a business to login and create a supplier account;
    automatically prompting an entry of project income data from the business through the interface program;
    receiving the project income data, wherein the project income data includes supplier payment information associated with funds paid to the business and that are associated with the business venture;
    receiving from the business via a network interface first expenditure data associated with a first plurality of payees each associated with receiving a respective first monetary allocation from the business, wherein the first plurality of employees are associated with a first round of a supply chain associated with the business venture;
    creating a first plurality of payee accounts through the interface program, wherein each of the first plurality of payee accounts corresponds to one of the first plurality of payees;
    using the interface program to automatically generate first correspondence addressed to the first plurality of payees to prompt a first payee of the first plurality of payees to provide first survey payment data indicative of how the first payee re-spent the first monetary allocation;

receiving via the network interface the first survey payment data from the first plurality of payees;

receiving from the first plurality of payees second expenditure data associated with a second plurality of payees each associated with receiving a respective second monetary allocation from the first plurality of payees, wherein the second plurality of employees are associated with a second round of a supply chain associated with the business venture, wherein the first round of the supply chain is associated with a user designated local region, and wherein the second round of the supply chain is associated with a user designated non-local region;

creating a second plurality of payee accounts through the interface program, wherein each of the second plurality of payee accounts corresponds to one of the second plurality of payees using the interface program to automatically generate second correspondence addressed to the second plurality of payees to prompt a second payee of the second plurality of payees to provide second survey payment data indicative of how the second payee re-spent the second monetary allocation;

receiving the second survey payment data from the second plurality of payees; and automatically accessing by the interface program the first survey payment data, the second survey payment data, and the project income data to generate by the interface program an indicator useful in assessing the economic impact of the business venture based on the re-spending by the first and second plurality of payees comprising the first and second rounds of the supply chain associated with the business venture.

2. The computer-implemented method of claim 1 further comprising receiving the first survey payment data from the plurality of payees.

3. The computer-implemented method of claim 1 further comprising receiving the first survey payment data comprising electronic mail from the plurality of payees.

4. The computer-implemented method of claim 1 further comprising the receiving project income data.

5. The computer-implemented method of claim 1 further comprising licensing access to at least one of the first survey payment data and the indicator.

6. The computer-implemented method of claim 1 further comprising receiving geographic data selectively defining an area of the analysis.

7. The computer-implemented method of claim 1, wherein generating the indicator comprises summing the expenditure data, the first and the second survey payment data, and the project income data, and dividing the sum by the project income data.

8. The computer-implemented method of claim 1 further comprising applying a formula to the expenditure data comprising personnel data, wherein the formula is associated with a re-spending rate.

9. The computer-implemented method of claim 1 further comprising automatically determining an error in the expenditure data.

10. The computer-implemented method of claim 1 further comprising assigning a value to a nonresponsive payee.

11. The computer-implemented method of claim 1 further comprising facilitating communications between an organization and the first payee of the organization.

12. The computer-implemented method of claim 1 further comprising accessing the first survey payment data according to at least one of a location and a type of the first payee.

13. An apparatus comprising:

A non-transitory memory storing program code configured to provide an interface program to enable a business to login and create a supplier account, to automatically prompt an entry of project income data from the business, to receive the project income data, wherein the project income data includes supplier payment information associated with funds paid to the business and that are associated with the business venture, to receive from the business via a network interface first expenditure data associated with a first plurality of payees each associated with receiving a respective first monetary allocation from the business, wherein the first plurality of employees are associated with a first round of a supply chain associated with the business venture, to create a first plurality of payee accounts, wherein each of the first plurality of payee accounts corresponds to one of the first plurality of payees, to automatically generate first correspondence addressed to the first plurality of payees to prompt a first payee of the first plurality to first survey payment data indicative of how the first payee re-spent the first monetary allocation, receiving via the network interface the first survey payment data from the first plurality of payees, to receive from the first plurality of payees second expenditure data associated with a second plurality of payees each associated with receiving a respective second monetary allocation from the first plurality of payees, wherein the second plurality of employees are associated with a second round of a supply chain associated with the business venture, to create a second plurality of payee accounts, wherein each of the second plurality of payee accounts corresponds to one of the second plurality of payees, to generate second correspondence addressed to the second plurality of payees to prompt a second payee of the second plurality of payees to provide second survey payment data indicative of how the second payee re-spent the second monetary allocation, to receive the second survey payment data from the second plurality of payees, and to automatically access the first survey payment, the second survey payment data, and the project income data to generate an indicator useful in assessing the economic impact of the business venture based on the re-spending by the first and second plurality of payees comprising the first and second rounds of the supply chain associated with the business venture, wherein the first round of the supply chain is associated with a user designated local region, and wherein the second round of the supply chain is associated with a user designated non-local region; and a processor in communication with the memory and configured to execute the program code.

14. The apparatus of claim 13, wherein the apparatus comprises a server.

15. The apparatus of claim 13, wherein the program code is further configured to receive geographic data defining a boundary of the economic assessment.

16. A program product, comprising:

program code executed by a computer processor configured to enable a business to login and create a supplier account, to automatically prompt an entry of project income data from the business, to receive the project income data, wherein the project income data includes supplier payment information associated with funds paid to the business and that are associated with the business venture, to receive from the business via a network interface first expenditure data associated with a first plurality of payees each associated with receiving a respective first monetary allocation from the business, wherein the first plurality of employees are associated with a first round of a supply chain associated with the business venture, to create a first plurality of payee accounts, wherein each of the first plurality of payee accounts corresponds to one of the first plurality of payees, to automatically generate first correspondence addressed to the first plurality of payees to prompt a first payee of the first plurality to provide first survey payment data indicative of how the first payee re-spent the first monetary allocation, receiving via the network interface the first survey payment data from the first plurality of payees, to receive from the first plurality of payees second expenditure data associated with a second plurality of payees each associated with receiving a respective second monetary allocation from the first plurality of payees, wherein the second plurality of employees are associated with a second round of a supply chain associated with the business venture, to create a second plurality of payee accounts, wherein each of the second plurality of payee accounts corresponds to one of the second plurality of payees, to generate second correspondence addressed to the second plurality of payees to prompt a second payee of the second plurality of payees to provide second survey payment data indicative of how the second payee re-spent the second monetary allocation, to receive the second survey payment data from the second plurality of payees, and to automatically access the first survey payment, the second survey payment data, and the project income data to generate an indicator useful in assessing the economic impact of the business venture based on the re-spending by the first and second plurality of payees comprising the first and second rounds of the supply chain associated with the business venture, wherein the first round of the supply chain is associated with a user designated local region, and wherein the second round of the supply chain is associated with a user designated non-local region; and a non-transitory computer readable medium bearing the program code.

17. The method of claim 1, further comprising using environmental related information to generate the indicator.

18. The method of claim 1, further comprising using social network related information to generate the indicator.

19. The method of claim 1, further comprising:
receiving from the second plurality of payees third expenditure data associated with a third plurality of payees each associated with receiving a respective third monetary allocation from the second plurality of payees, wherein the third plurality of employees are associated with a third round of a supply chain associated with the business venture;

creating a third plurality of payee accounts, wherein each of the third plurality of payee accounts corresponds to one of the third plurality of payees;

using the interface program to automatically generate third correspondence addressed to the third plurality of payees to prompt a third payee of the third plurality of payees to provide third survey payment data indicative of how the third payee re-spent the third monetary allocation;

receiving via the interface the third survey payment data from the third plurality of payees; and using the third survey payment data to calculate the indicator.

\* \* \* \* \*